(12) United States Patent
Ouyang

(10) Patent No.: US 8,254,138 B2
(45) Date of Patent: Aug. 28, 2012

(54) ELECTRONIC DEVICE WITH PROTECTIVE COVER

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 216 days.

(21) Appl. No.: 12/829,481

(22) Filed: Jul. 2, 2010

(65) Prior Publication Data

US 2011/0211318 A1    Sep. 1, 2011

(30) Foreign Application Priority Data

Feb. 26, 2010   (CN) .......................... 2010 1 0114990

(51) Int. Cl.
*H05K 5/00*     (2006.01)

(52) U.S. Cl. .................... 361/752; 361/730; 361/756

(58) Field of Classification Search .................. 361/727, 361/728–730, 756, 679.56; 455/575.1–575.3, 455/575.7–575.8; 439/97, 135
See application file for complete search history.

(56) References Cited

U.S. PATENT DOCUMENTS

| 6,991,490 | B1 * | 1/2006 | Su | 439/521 |
| 7,048,556 | B2 * | 5/2006 | Stanton et al. | 439/135 |
| 7,058,435 | B2 * | 6/2006 | Yamazaki | 455/575.8 |
| 7,083,439 | B1 * | 8/2006 | Hayakawa et al. | 439/136 |
| 7,611,371 | B2 * | 11/2009 | Guo | 439/367 |
| 8,155,715 | B2 * | 4/2012 | Yang et al. | 455/575.3 |

\* cited by examiner

*Primary Examiner* — Hung S Bui
(74) *Attorney, Agent, or Firm* — Altis Law Group, Inc.

(57) ABSTRACT

An electronic device having an external interface is disclosed including a housing having a positioning board, a protective cover having a cover portion, and a securing assembly secured to the positioning board. The cover portion is for covering or exposing the external interface. The securing assembly and the positioning board cooperatively prevent a portion of the protective cover from separating from the housing.

15 Claims, 5 Drawing Sheets

ELECTRONIC DEVICE WITH PROTECTIVE COVER

BACKGROUND

1. Technical Field

The exemplary embodiment relates to electronic devices, more particularly to an electronic device with a protective cover.

2. Description of the Related Art

Electronic devices usually have external interfaces (e.g., universal serial bus (USB)) for electrically connecting peripheral devices (e.g., printers), accessories (e.g., USB flash drives) or other electronic devices. Such external interfaces should be protected by cover mechanisms from e.g., dust or water, to maintain proper function.

The cover mechanisms usually include protective covers with locks. The protective covers are typically locked to the electronic devices by latches to cover the area through which the interfaces of electronic devices are exposed. However, the protective covers are often not permanently attached to the electronic device. Thus, the protective covers may easily be misplaced or lost when not locked to the electronic devices.

Therefore, there is room for improvement within the art.

BRIEF DESCRIPTION OF THE DRAWINGS

Many aspects of the present electronic device with a protective cover can be better understood with reference to the following drawings. The components in the drawings are not necessarily drawn to scale, the emphasis instead being placed upon clearly illustrating the principles of the present electronic device using the same. Moreover, in the drawings, like reference numerals designate corresponding parts throughout the several views.

DETAILED DESCRIPTION

Figure 1:
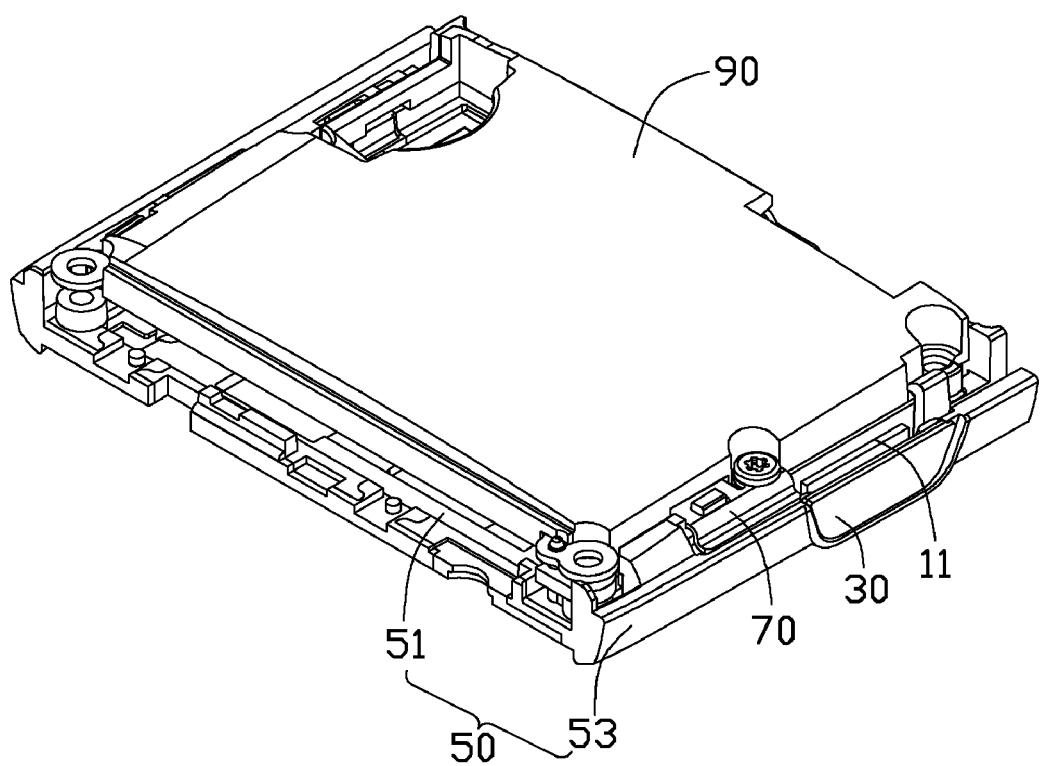
FIG. 1 is an assembled isometric view of an electronic device with a protective cover according to an exemplary embodiment.
Figure 2:
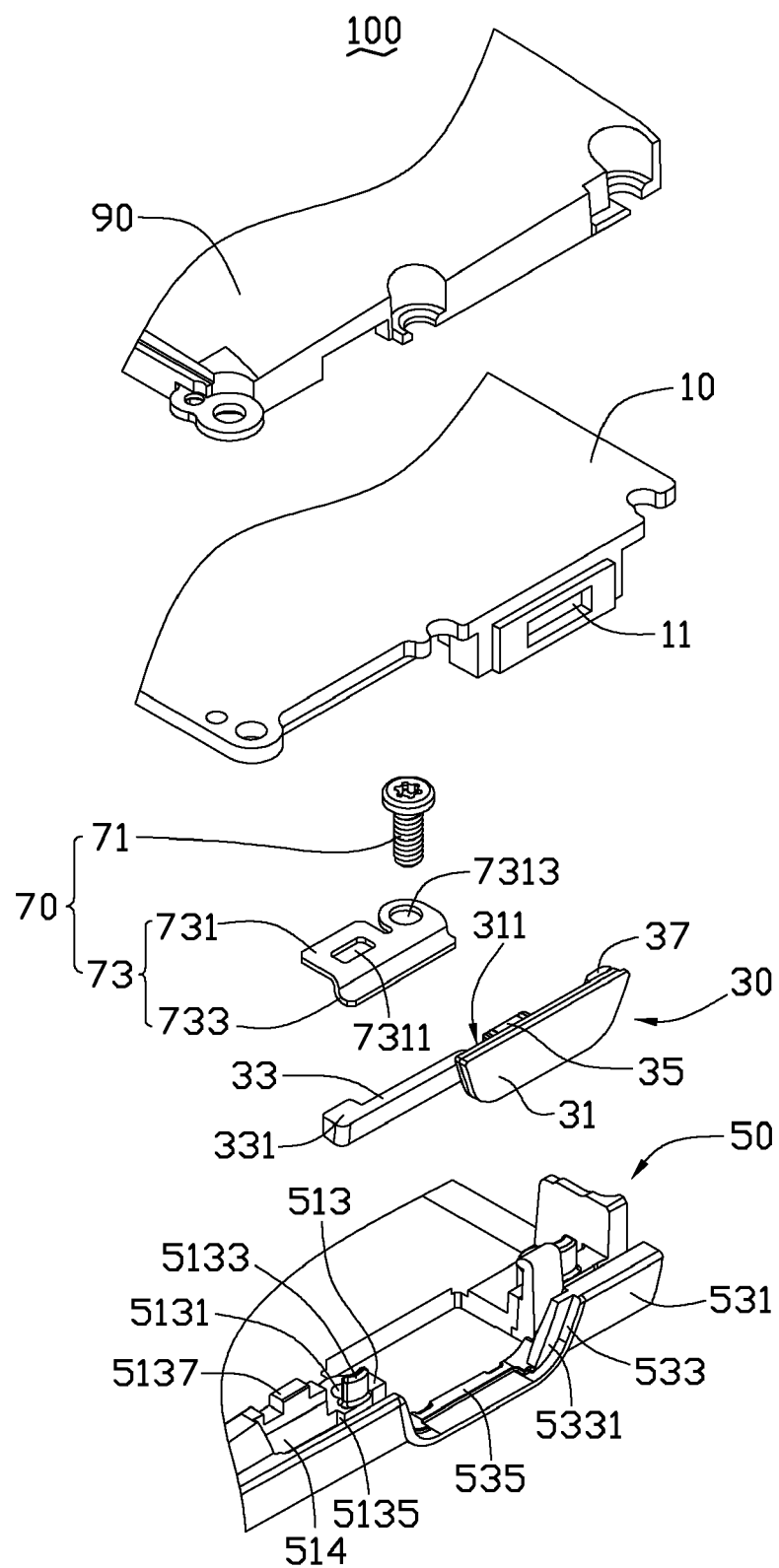
FIG. 2 is an exploded view of the electronic device shown in FIG. 1.

FIGS. 1 and 2 show an exemplary embodiment of an electronic device in the form of a mobile phone 100 including a circuit board 10, a protective cover 30, a housing 50, a securing assembly 70 and a shielding can 90. The circuit board 10 is mounted inside the housing 50. The securing assembly 70 secures the protective cover 30 to the housing 50. The shielding can 90 can be mounted inside the housing 50, shielding electronic components of the circuit board 10. In other embodiments, the shielding can 90 can be omitted.

The circuit board 10 has an external interface 11. The protective cover 30 is for protecting the external interface 11 from e.g., dust or water, to maintain proper function. The protective cover 30 is flexible and can be made of flexible materials such as rubber. The protective cover 30 includes a cover portion 31, a bendable connecting arm 33, a securing portion 35 and a locking portion 37. The cover portion 31 includes an abutting surface 311. The connecting arm 33, the securing portion 35 and the locking portion 37 are spaced apart and located at the same side of the cover portion 31 with the abutting surface 311. The securing portion 35 is located between the connecting arm 33 and the locking portion 37. The connecting arm 33 is generally extends from an end of the abutting surface 311 and has a resisting portion 331 distal to the abutting surface 311. The securing portion 35 protrudes substantially perpendicularly from the abutting surface 311, having substantially the same shape and size as the interface hole of the external interface 11. Accordingly, the securing portion 35 can be secured in the interface hole of the external interface 11. The locking portion 37 extends from the abutting surface 311 opposite to the connecting arm 33 for locking the protective cover 30 with the housing 50.

The housing 50 includes a base board 51 and two opposite side boards 53 connecting the base board 51. The base board 51 has the circuit board 10 mounted thereon. The base board 51 includes a positioning board 513 adjacent to and substantially parallel with one of the side boards 53. The positioning board 513, the adjacent side board 53 and the base board 51 cooperatively enclose a mounting groove 514. The mounting groove 514 has substantially the same shape and size as the connecting arm 33. Accordingly, the connecting arm 33 can be slidably secured into the mounting groove 514. The positioning board 513 includes a positioning hole 5131, a supporting portion 5133, a positioning portion 5135 and a latching portion 5137. The positioning hole 5131 can be a screw hole defined into the upper wall of the positioning board 513. The supporting portion 5133 protrudes from the top wall of the positioning board 513, near the positioning hole 5131. The positioning portion 5135 is generally wedge-shaped and protruding from the positioning board 513 towards the adjacent side board 53. The positioning portion 5135 is formed inside the mounting groove 514 for resisting against the resisting portion 331. The latching portion 5137 protrudes from the top wall of the positioning board 513, adjacent to the positioning hole 5131 and the supporting portion 5133.

The side boards 53 include a mounting wall 531, a securing slot 533 recessed in the mounting wall 531 and a through slot 535 is defined in the mounting wall 531. The securing slot 533 can align with the external interface 11 for securing the cover portion 31. The securing slot 533 includes a bottom wall 5331. The through slot 535 aligns and communicates with the securing slot 533. The through slot 535 is smaller than the securing slot 533.

The securing assembly 70 includes a fixing member 71 and a positioning member 73. The fixing member 71 can be a threaded rod for fixing the positioning member 73 to the housing 50 by threadingly securing into the positioning hole 5131. The positioning member 73 includes a fixing portion 731 and a limiting portion 733 curvedly extending from the fixing portion 731. The fixing portion 731 defines a latching hole 7311 and a through hole 7313. The latching hole 7311 latches the latching portion 5137 therein for latching the positioning member 73 with the positioning board 513. The limiting portion 733 covers the mounting groove 514 and limits the detachment of the connecting arm 33 from the mounting groove 514.

Figure 3:
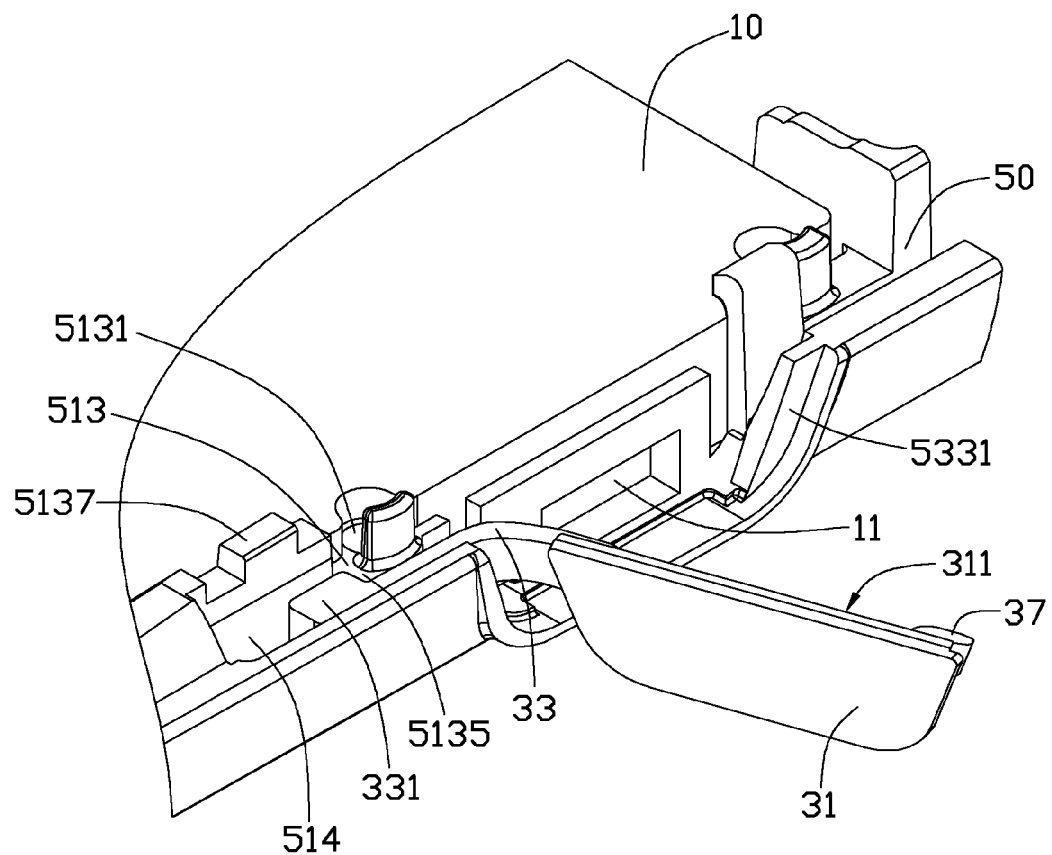
FIG. 3 is an enlarged view of the electronic device shown in FIG. 1 in an open position.
Figure 4:
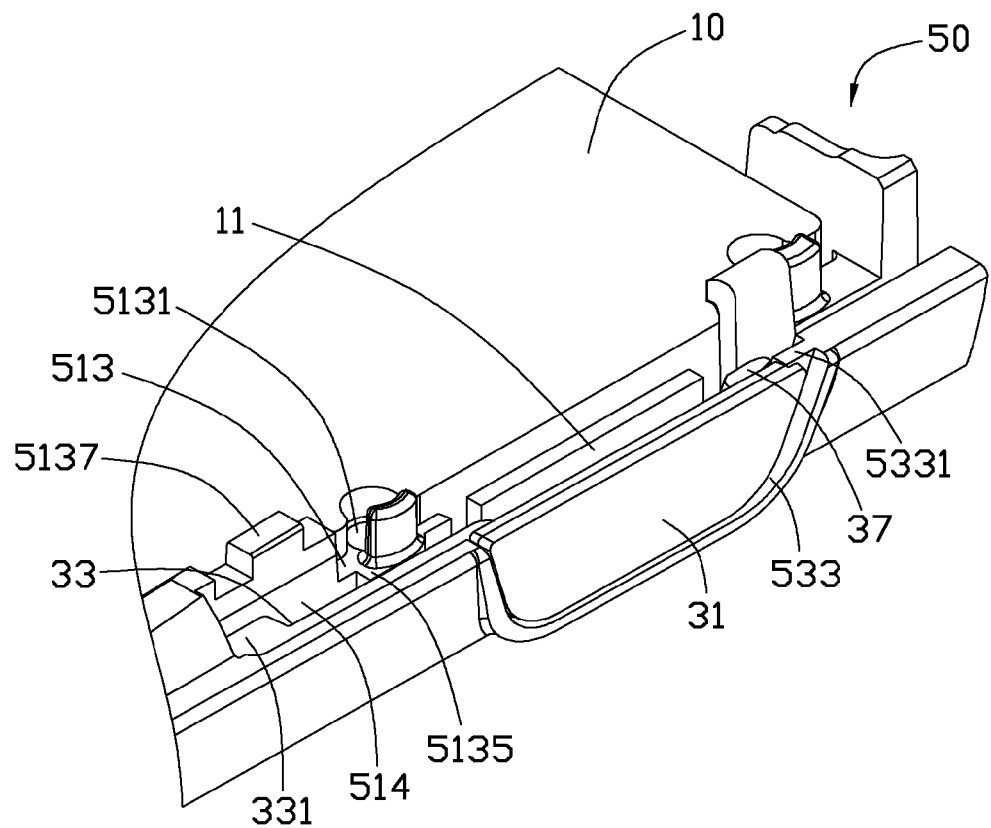
FIG. 4 is an enlarged view of the electronic device shown in FIG. 1 in a closed position.
Figure 5:
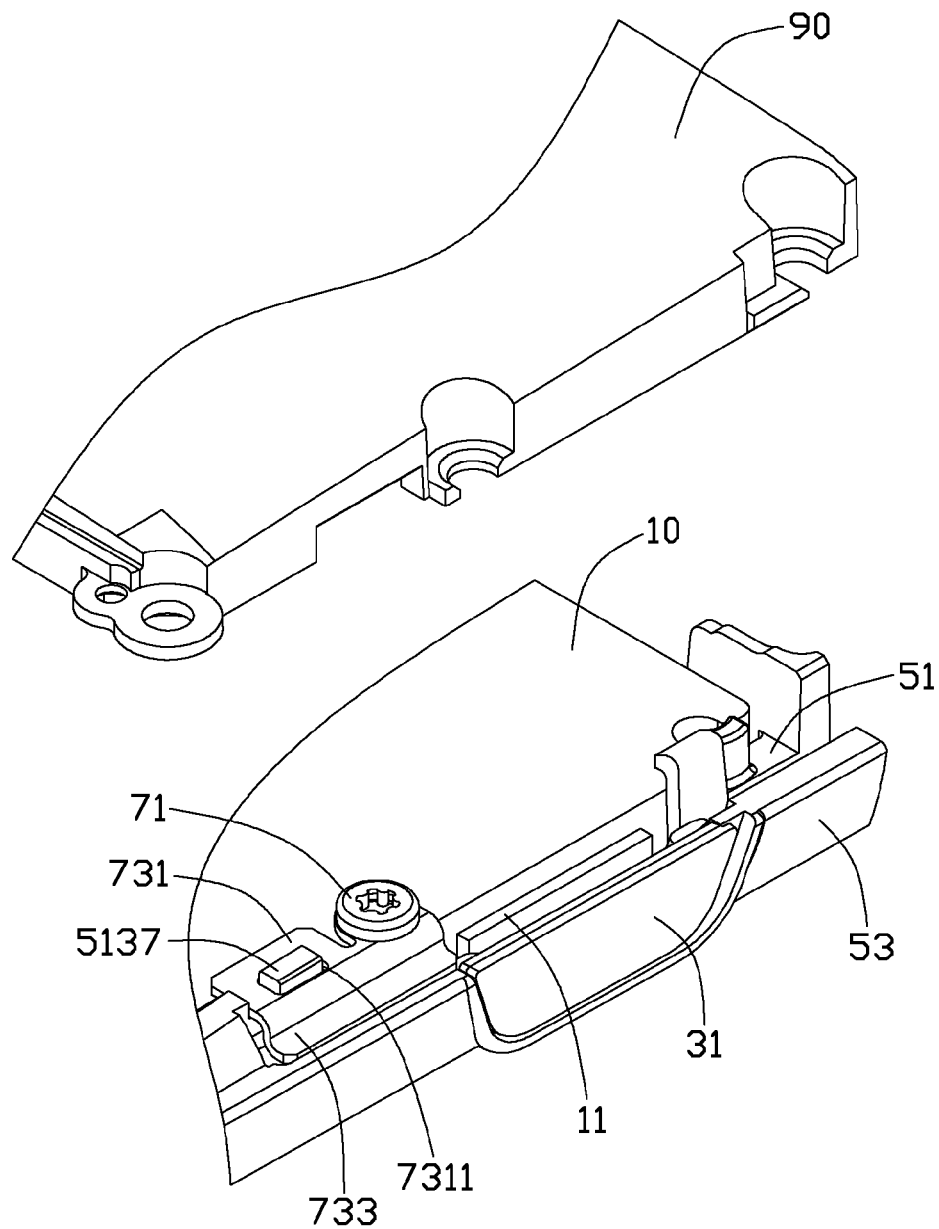
FIG. 5 is a partially exploded view of the electronic device shown in FIG. 4.

Referring further to FIGS. 3 through 5, during assembly of the electronic device 100, the circuit board 10 is mounted to the base board 51 with the external interface 11 aligning with the securing slot 533 and the through slot 535. The protective cover 30 is mounted to the housing 50, enabling the connecting arm 33 to slidably engage into the mounting groove 514. The abutting surface 311, the securing portion 35, and the locking portion 37 are turned towards the inside of the housing 50. The cover portion 31 attaches to the housing 50, and is received in the securing slot 533 with the abutting surface 311 abutting against the bottom wall 5331 of the securing slot 533. The securing portion 35 secures into the interface hole of the external interface 11. During this process, the connecting arm 33 slides along the mounting groove 514 until the securing portion 35 secures into the interface hole of the external interface 11. At this time, the locking portion 37 resists against and locks with the flange of the bottom wall 5331.

The shielding can 90 can be mounted to the housing 50, shielding the circuit board 10. The fixing member 71 passes through the through hole 7313 to threadingly screw into the positioning hole 5131, fixing the positioning member 73 with the housing 50. Meanwhile, the latching hole 7311 latches the latching portion 5137 therein. The fixing portion 731 resists against the supporting portion 5133 and the latching portion 5137, and the limiting portion 733 covers the mounting groove 514. Accordingly, the assembly of the protective cover 30 to the electronic device 100 is completed and maintained in a closed position with the external interface 11 covered by the cover portion 31.

To expose the external interface 11 to the outside, release the lock of the securing portion 35 from the interface hole of the external interface 11 and simultaneously release the lock of the locking portion 37 for the bottom wall 5331. The cover portion 31 is further pulled out of the securing slot 533, the connecting arm 33 being deformed, and slides along the mounting groove 514, until the external interface 11 is completely exposed to the outside. At this time, the protective cover 30 and the electronic device 100 maintain in an open position. Additionally, the resisting portion 331 and the limiting portion 733 can resist against the positioning portion 5135, effectively preventing the connecting arm 33 from detaching relative to the mounting groove 514. Accordingly, the protective cover 30 is prevented from separating from the housing 50.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An electronic device, comprising:
a housing having a base board and a side board connecting the base board, the side board defining a through slot, the base board forming a positioning board adjacent to the through slot, the positioning board including a latching portion formed thereon, the positioning board, the base board and the side board cooperatively enclosing a mounting groove;
a circuit board defining an external interface having an interface hole;
a protective cover for selectively covering the external interface, comprising a cover portion and a bendable connecting arm connecting with the cover portion, the cover portion covering the through slot, preventing the interface hole of the external interface from being exposed by the through slot, the connecting arm slidably engaging in the mounting groove; and
a securing assembly comprising a positioning member, the positioning member defining a latching hole latching the latching portion therein to secure the securing assembly to the positioning board, the securing assembly and the positioning board cooperatively preventing the connecting arm from detaching from the mounting groove.

2. The electronic device as claimed in claim 1, wherein:
the securing assembly further comprises a fixing member;
the positioning member defines a through hole, and the positioning board defines a positioning hole adjacent to the latching portion; and
the fixing member passes through the through hole and fixes in the positioning hole.

3. The electronic device as claimed in claim 1, wherein:
the positioning board is positioned spaced and parallel to the side boards, the positioning board includes a positioning portion received in the mounting groove; and
the connecting arm forms a resisting portion, the positioning portion resisting against the resisting portion, preventing the connecting arm from sliding out of the mounting groove.

4. The electronic device as claimed in claim 1, wherein the side board defines a securing slot having a bottom wall and the through slot defined through the bottom wall, the cover portion resisting against the bottom wall to be secured in the securing slot.

5. The electronic device as claimed in claim 4, wherein:
the protective cover further comprises a locking portion opposite to the connecting arm, the locking portion and the connecting arm positioned at the same side of the cover portion; and
the locking portion deformably resisting with the bottom wall, locking with the bottom wall.

6. The electronic device as claimed in claim 5, wherein the protective cover further includes a securing portion for being secured in the interface hole of the external interface when the interface hole of the external interface is to be covered, the securing portion formed between the locking portion and connecting arm.

7. The electronic device as claimed in claim 1, wherein the positioning member includes a limiting portion, the limiting portion covers the mounting groove and limits the detachment of the connecting arm from the mounting groove.

8. An electronic device having an external interface, comprising:
a housing having a positioning board forming a latching portion;
a protective cover comprising a cover portion, the cover portion attached to the housing to selectively cover the interface hole of the external interface, or detached from the housing to expose the interface hole of the external interface; and
a securing assembly comprising a positioning member, the positioning member defining a latching hole latching the latching portion therein to secure the securing assembly to the positioning board, the securing assembly preventing a portion of the protective cover from separating from the housing in a first direction, the positioning board preventing the portion of the protective cover from separating from the housing in a second direction substantially perpendicular to the first direction.

9. The electronic device as claimed in claim 8, wherein:
the housing comprises a base board and a side board connecting the base board;
the side board defines a through slot, the base board forms the positioning board adjacent to the through slot; and
the positioning board, the base board and the side board cooperatively enclose a mounting groove receiving the portion of the protective cover.

10. The electronic device as claimed in claim 9, wherein:
the portion of the protective cover is a bendable connecting arm connecting with the cover portion, the cover portion covering the through slot, preventing the interface hole of the external interface for being exposed by the through slot, the connecting arm slidably engaging in the mounting groove.

11. The electronic device as claimed in claim 10, wherein:
the securing assembly further comprises a fixing member;
the positioning member defines a through hole, and the positioning board defines a positioning hole adjacent to the latching portion; and
the fixing member passes through the through hole and fixes in the positioning hole.

12. The electronic device as claimed in claim 10, wherein:
the positioning board is positioned spaced and parallel to the side boards, the positioning board includes a positioning portion received in the mounting groove; and
the connecting arm forms a resisting portion, the positioning portion resisting against the resisting portion, preventing the connecting arm from sliding out of the mounting groove.

13. The electronic device as claimed in claim 10, wherein the side board defines a securing slot having a bottom wall and the through slot defined through the bottom wall, the cover portion resisting against the bottom wall to be secured in the securing slot.

14. The electronic device as claimed in claim 13, wherein:
the protective cover further comprises a locking portion opposite to the connecting arm, the locking portion and the connecting arm positioned at the same side of the cover portion; and
the locking portion deformably resisting with the bottom wall, locking with the bottom wall.

15. The electronic device as claimed in claim 14, wherein the protective cover further includes a securing portion for being secured in the interface hole of the external interface when the interface hole of the external interface is to be covered, the securing portion formed between the locking portion and connecting arm.

* * * * *